(12) United States Patent
Yam et al.

(10) Patent No.: US 11,960,774 B2
(45) Date of Patent: Apr. 16, 2024

(54) SYSTEM, METHOD, AND DEVICE FOR UPLOADING DATA FROM PREMISES TO REMOTE COMPUTING ENVIRONMENTS

(71) Applicant: The Toronto-Dominion Bank, Toronto (CA)

(72) Inventors: Andrew Kai Ming Yam, Mississauga (CA); Adrian Ariel Ionescu, Vaughan (CA); Upal Sayeed Hossain, Toronto (CA); George Knapp, Mullica Hill, NJ (US)

(73) Assignee: The Toronto-Dominion Bank, Toronto (CA)

( * ) Notice: Subject to any disclaimer, the term of this patent is extended or adjusted under 35 U.S.C. 154(b) by 9 days.

(21) Appl. No.: 17/813,764

(22) Filed: Jul. 20, 2022

(65) Prior Publication Data
US 2024/0028264 A1 Jan. 25, 2024

(51) Int. Cl.
*G06F 3/06* (2006.01)
(52) U.S. Cl.
CPC ............ *G06F 3/067* (2013.01); *G06F 3/0604* (2013.01); *G06F 3/0647* (2013.01)
(58) Field of Classification Search
CPC ....... G06F 3/067; G06F 3/0604; G06F 3/0647
See application file for complete search history.

(56) References Cited

U.S. PATENT DOCUMENTS

| | | | |
|---|---|---|---|
| 6,950,900 B1 * | 9/2005 | McKean | G06F 11/2092 711/114 |
| 10,713,247 B2 | 7/2020 | Petropoulos et al. | |
| 10,908,947 B2 | 2/2021 | Tajuddin et al. | |
| 11,055,280 B2 | 7/2021 | Huang et al. | |
| 11,269,859 B1 | 3/2022 | Luedtke et al. | |
| 2007/0198463 A1 * | 8/2007 | Sarakas | G06F 16/188 |
| 2015/0088827 A1 * | 3/2015 | Xu | G06F 3/0619 707/634 |

(Continued)

FOREIGN PATENT DOCUMENTS

| | | |
|---|---|---|
| EP | 3069275 | 5/2015 |
| KR | 20200129892 A * | 11/2020 |

OTHER PUBLICATIONS

Armbrust, Michael et al.; Delta lake; high performance ACID table storage over cloud object stores; Proceedings of the VLDB Endowment (vol. 13, Issue 12) pp. 3411-3424, Aug. 1, 2020; https://databricks.com/jp/wp-content/uploads/2020/08/p975-armbrust.pdf.

*Primary Examiner* — Michael Krofcheck
(74) *Attorney, Agent, or Firm* — CPST Intellectual Property Inc.; Brett J. Slaney

(57) ABSTRACT

A system, method and device for ingesting data files into remote computing environments is disclosed. The method includes receiving a plurality of data files and processing same according to a modified round-robin (MRR) process. The MRR assigns data files for processing by determining which of a plurality of remote processors are active, and by determining an amount of queued processing for the active remote processors. The method includes assigning each data file of the plurality of data files to a remote processor of the plurality of remote processors based on the remote processor (1) being active, and (2) having a relatively lower amount of queued processing. The method includes instructing a storage writer to store processed data files.

19 Claims, 13 Drawing Sheets

(56) References Cited

U.S. PATENT DOCUMENTS

| | | | |
|---|---|---|---|
| 2015/0261468 A1* | 9/2015 | Khoyi | G06F 3/0653 |
| | | | 711/114 |
| 2016/0314023 A1* | 10/2016 | Shum | G06F 9/5083 |
| 2018/0101805 A1* | 4/2018 | Park | G06Q 10/06393 |
| 2018/0165309 A1* | 6/2018 | Tajuddin | G06F 16/258 |
| 2019/0163754 A1* | 5/2019 | Huang | G06F 16/254 |
| 2019/0373036 A1* | 12/2019 | Howard | H04N 21/4621 |
| 2020/0004582 A1* | 1/2020 | Fornash | G06F 9/4856 |
| 2020/0210443 A1 | 7/2020 | Srinivasan et al. | |
| 2021/0133151 A1* | 5/2021 | Keshtkarjahromi | |
| | | | G06F 16/90335 |

* cited by examiner

US 11,960,774 B2

SYSTEM, METHOD, AND DEVICE FOR UPLOADING DATA FROM PREMISES TO REMOTE COMPUTING ENVIRONMENTS

TECHNICAL FIELD

The following relates generally to methods of transferring data from premise(s) into remote computing environment(s).

BACKGROUND

Enterprises increasingly rely upon remote, and possibly distributed, computing environments (e.g., cloud computing environments), as compared to local computing resources within their control (alternatively referred to as on-premises or on-prem resources), to implement their digital infrastructure.

Transitioning data files from on-premises resources to remote computing environments can require implementing a framework capable of migrating potentially vast amounts of data generated regularly for existing operations, or of migrating potentially vast amounts of legacy data. Adding to the challenge, the data being uploaded can be heterogeneous, and be uploaded from various applications as configured by the existing local computing resource. Other differences in the data being uploaded, the source of the data, or the frameworks implemented by the existing on premises infrastructure to process or store the data can further complicate transition efforts.

Implementing a framework for migrating local data to a remote computing environment, which is at least one of fast, efficient, accurate, robust, modular, adaptable, and cost-effective is desirable.

BRIEF DESCRIPTION OF THE DRAWINGS

Embodiments will now be described with reference to the appended drawings wherein.

DETAILED DESCRIPTION

Figure 1:
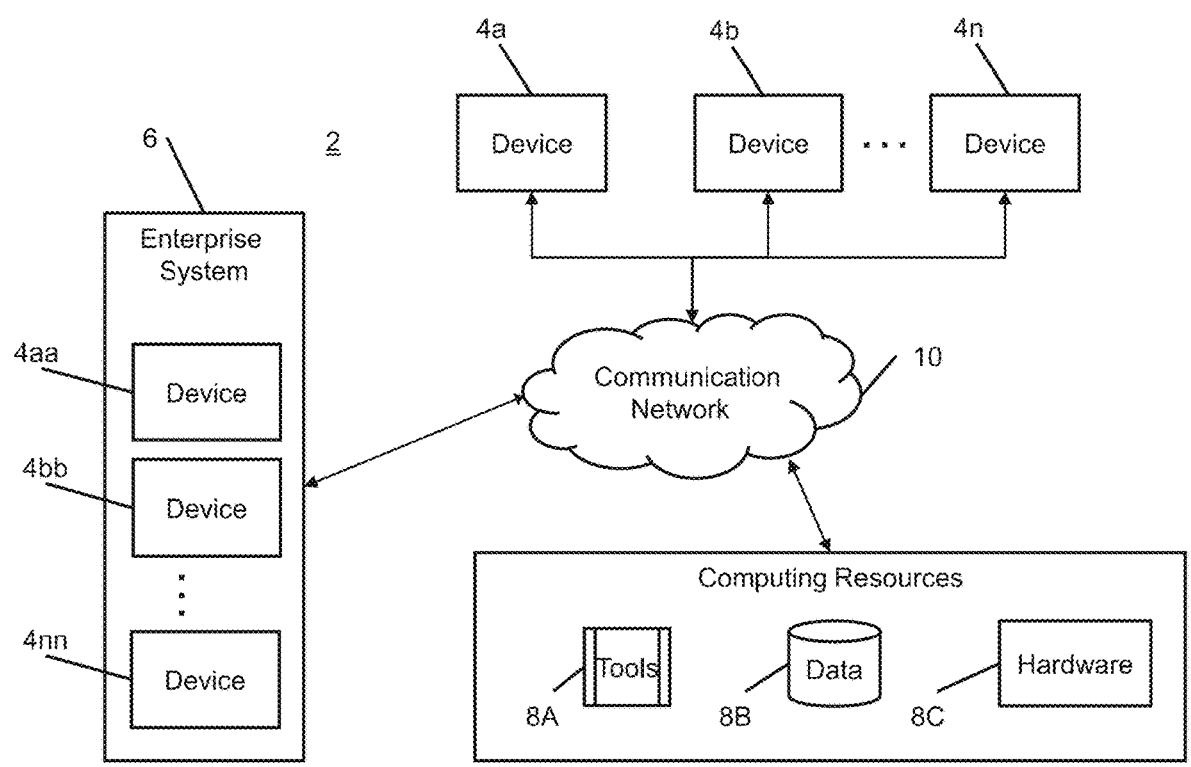
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

The following generally relates to a framework for uploading data files into a remote (e.g., cloud-based) computing environment. The framework includes processing data files with a modified round robin process that includes determining which of a plurality of remote processors is active and determining the amount of queued processing for the active remote processors. The modified round-robin process assigns data files to remote processors of the plurality of remote processors based on whether they are active and based on which processor has the lowest amount of queued processing. In this way, the modified round-robin process can avoid unnecessarily activating processors, potentially avoiding the expense associated therewith.

In example embodiments, the data files and the processors are separated and serve only a group(s) of two or more heterogeneous groups. Groups which disproportionate effect latency, such as a large file group, can therefore be separated into a different stream of processing to ensure timely processing of the other heterogeneous groups. Moreover, the separation of the data files to be processed into heterogeneous groups can allow greater control of the service architecture associated with each particular group. For example, greater resources can be assigned to groups expected to have a high latency.

In example embodiments, data files to be ingested are received by a first landing zone, which requires requesters to authenticate the request, their identity, etc. Data files in the first landing zone can be transferred to a second landing zone associated with the environment in which processed data files are stored only upon satisfactory authentication. Implementations with two landing zones can allow for modularity (e.g., only the first landing zone needs to be adjusted in response to changing security protocols). In at least some contemplated example embodiments, the first landing zone only persists data files for a limited time (e.g., 15 minutes) thereby enforcing promptness, increasing security, and reducing costs associated with potentially unauthorized data files.

The disclosed framework can include processing the data files according to a configuration file. The configuration file, which can be unique to a data source (e.g., a legacy database), can allow for incremental source by source integration into the remote resources. A new source can be integrated with the addition of a new configuration file, and without requiring reconfiguration of past efforts with different data files, and without requiring downtime of the remote resources.

According to one aspect, a device for ingesting data files into remote computing environments for storage is disclosed. The device includes a processor, a communication module coupled to the processor, and a memory coupled to the processor. The memory stores computer executable instructions that when executed by the processor cause the processor to receive a plurality of data files, and process the plurality of data files according to a modified round-robin process. The modified round-robin process assigns data files for processing by: determining which of a plurality of remote processors are active, and determining an amount of queued processing for the active remote processors. Each data file of the plurality of data files is assigned to a remote processor of the plurality of remote processors based on the remote processor (1) being active, and (2) having a relatively lower amount of queued processing. The instructions cause the processor to instruct a storage writer to store processed data files.

In example embodiments, processing the plurality of data files comprises validating the plurality of data files, and the instructions further cause the processor to validate each data file based on an associated configuration file received from a metadata container. The configuration file can define processing patterns for maintaining control information and for processing different file types.

The processing patterns for maintaining control information can include parameters for (1) extracting control dimensions; and (2) validating that the individual data file satisfies the extracted control dimensions. The processing patterns for processing different file types comprise parameters for: adjusting the individual data file into a format accepted for storage, and validating that the individual data file satisfies entry validation parameters.

In example embodiments, the plurality of data files are received from one or more on-premises systems, and the instructions further cause the processor to transfer the received data files from a first secured landing zone into a second landing zone associated with an environment in which processed and validated data files are stored.

In example embodiments, the instructions further cause the processor to determine, for each data file in the plurality of data files, if the individual data file is associated with one of two or more heterogenous groups. The round robin process assigns files based on which heterogenous group the individual data file is associated with. The two or more heterogenous groups can include a large data file group and a small data file group. The large data files can be assigned based on a maximum large file parameter of the plurality of remote processors. At least one of the plurality of remote processors can solely processes large data files. The small data files can be assigned to remote processors without regard for a maximum large file parameter of the plurality of remote processors. At least one of the plurality of remote processors can solely processes small data files.

In example embodiments, processing new data files is delayed if (1) no currently active remote processors have capacity to process the new data files, and (2) a number of the new data files is below a minimum threshold for activating inactive remote processors.

In another aspect, a method for ingesting data files into remote computing environments is disclosed. The method includes receiving a plurality of data files and processing the plurality of data files according to a modified round-robin process. The modified round-robin process assigning data files for processing by determining which of a plurality of remote processors are active, and by determining an amount of queued processing for the active remote processors. The method includes assigning each data file of the plurality of data files to a remote processor of the plurality of remote processors based on the remote processor (1) being active, and (2) having a relatively lower amount of queued processing. The method includes instructing a storage writer to store processed data files.

In example embodiments, processing the plurality of data files comprises validating the plurality of data files, and the method includes validating each data file based on an associated configuration file received from a metadata container.

The configuration file can define processing patterns for maintaining control information and for processing different file types.

The processing patterns for maintaining control information can include parameters for (1) extracting control dimensions; and (2) validating that the individual data file satisfies the extracted control dimensions. The processing patterns for processing different file types can include parameters for adjusting the individual data file into a format accepted for storage, and validating that the individual data file satisfies entry validation parameters.

In example embodiments, the plurality of data files is received from one or more on-premises systems, and the method includes transferring the received data files from a first secured landing zone into a second landing zone associated with an environment in which processed and validated data files are stored.

In example embodiments, the method includes determining, for each data file in the plurality of data files, if the individual data file is associated with one of two or more heterogenous groups. The round robin process assigns files based on which heterogenous group the individual data file is associated with.

The two or more heterogenous groups comprise a large data file group and a small data file group.

In another aspect, a non-transitory computer readable medium for ingesting data files into remote computing environments. The computer readable medium comprising computer executable instructions for receiving a plurality of data files, and processing the plurality of data files according to a modified round-robin process. The modified round-robin process assigning data files for processing by determining which of a plurality of remote processors are active, and determining an amount of queued processing for the active remote processors. Each data file of the plurality of data files is assigned to a remote processor of the plurality of remote processors based on the remote processor (1) being active, and (2) having a relatively lower amount of queued processing. A storage writer is instructed to store processed data files.

Referring now to FIG. 1, an exemplary computing environment 2 is illustrated. In the example embodiment shown, the computing environment 2 includes an enterprise system 6, one or more devices 4 (shown as devices 4a, 4b, 4n, external to the enterprise system 6, and devices 4aa, 4bb, and 4nn, internal to the enterprise system 6), and a remote computing environment 8 (shown individually as tool(s) 8A, database(s) 8B, and hardware 8C). Each of these components can be connected by a communications network 10 to one or more other components of the computing environment 2. In at least some example embodiments, all the components shown in FIG. 1 are within the enterprise system 6.

The one or more devices 4 shall hereinafter be referred to in the singular for ease of reference. An external device 4 can be operated by a party other than the party which controls the enterprise system 6; conversely, an internal device 4 can be operated by the party in control of the enterprise system 6. Any device 4 can be used by different users, and with different user accounts. For example, the internal device 4 can be used by an employee, third party contractor, customer, etc., as can the external device 4. The user may be required to be authenticated prior to accessing the device 4, the device 4 can be required to be authenticated prior to accessing either the enterprise system 6 or the remote computing environment 8, or any specific accounts or resources within computing environment 2.

The device 4 can access the information within the enterprise system 6 or remote computing environment 8 in a variety of ways. For example, the device 4 can access the enterprise system 6 via a web-based application, or a dedicated application (e.g., uploading module 712 of FIG. 7), etc. Access can require the provisioning of different types of credentials (e.g., login credentials, two factor authentication, etc.). In example embodiments, each different device 4 can be provided with a unique degree of access, or variations thereof. For example, the internal device 4 can be provided with a greater degree of access to the enterprise system 6 compared to the external device 4.

Devices 4 can include, but are not limited to, one or more of a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication networks such as the communication network 10 shown by way of example in FIG. 1.

The remote computing environment 8 (hereinafter referred to in the alternative as computing resources 8) includes resources used by, or available, to the enterprise system 6 that are stored or managed by a party other than operator of the enterprise system 6. For example, the computing resources 8 can include cloud-based storage services (e.g., database(s) 8B). In at least some example embodiments, the computing resources 8 include one or more tools 8A developed or hosted by the external party, or tools 8A for interacting with the computing resources 8. In at least one contemplated embodiment, the tool 8A (referred to in the singular for ease of reference) is a tool for managing data lakes, and more specifically a tool for scheduling writing to a data lake associated with the Microsoft™ Azure™ data storage and processing platform. Further particularizing the example, the tool 8A can allow a device 4 (e.g., internal device 4*aa*) to access the computing resources 8, and to thereafter configure an ingestion procedure wherein different data files are assigned to different processors (e.g., the hardware 8C) within the computing resources 8 based on a configuration file. The tool 8A can be or include aspects of a machine learning tool, or a tool associated with the Delta Lake Storage (ALDS)™ suite, etc. The computing resources 8 can also include hardware resources 8C, such as access to processing capability of server devices (e.g., cloud computing), and so forth.

Communication network 10 may include a telephone network, cellular, and/or data communication network to connect distinct types of client devices. For example, the communication network 10 may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet). The communication network 10 may not be required to provide connectivity within the enterprise system 6 or the computing resources 8, or between devices, wherein an internal or other shared network provides the necessary communications infrastructure.

The computing environment 2 can also include a cryptographic server or module (e.g., encryption module 806 of FIG. 8) for performing cryptographic operations and providing cryptographic services (e.g., authentication (via digital signatures), data protection (via encryption), etc.) to provide a secure interaction channel and interaction session, etc. The cryptographic module can be implemented within the enterprise system 6, or the computing resources 8, or external to the aforementioned systems, or some combination thereof. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications carried out by the enterprise system 6 or device 4. The cryptographic server may be used to protect data within the computing environment 2 (e.g., including data stored in database(s) 8B) by way of encryption for data protection, digital signatures or message digests for data integrity, and by using digital certificates to authenticate the identity of the users and entity devices with which the enterprise system 6, computing resources 8, or the device 4 communicates to inhibit data breaches by adversaries. It can be appreciated that various cryptographic mechanisms and protocols can be chosen and implemented to suit the constraints and requirements of the computing environment 2, as is known in the art.

The enterprise system 6 can be understood to encompass the whole of the enterprise, a subset of a wider enterprise system (not shown), such as a system serving a subsidiary, or a system for a particular branch or team of the enterprise (e.g., a resource migration division of the enterprise). In at least one example embodiment, the enterprise system 6 is a financial institution system (e.g., a commercial bank) that provides financial services accounts to users and processes financial transactions associated with those financial service accounts. Such a financial institution system may provide to its customers various browser-based and mobile applications, e.g., for mobile banking, mobile investing, mortgage management, etc. Financial institutions can generate vast amounts of data, and have vast amounts of existing records, both of which can be difficult to migrate into a digital and remote computing environment.

The enterprise system 6 can request, receive a request to, or have implemented thereon (at least in part), a method for uploading data from an on-premises location or framework onto the computing resources 8. In existing solutions, data, particularly heterogeneous data, can be updated without regard to the variation within the data. Moreover, some existing approaches ignore the economic realities of remote computing environments when considering the minutiae of implementing an infrastructure for managing a plurality of data. For example, existing approaches stress accuracy and speed, and may overlook or assign a lower importance to processing costs, in the short or the near term.

Figure 2:
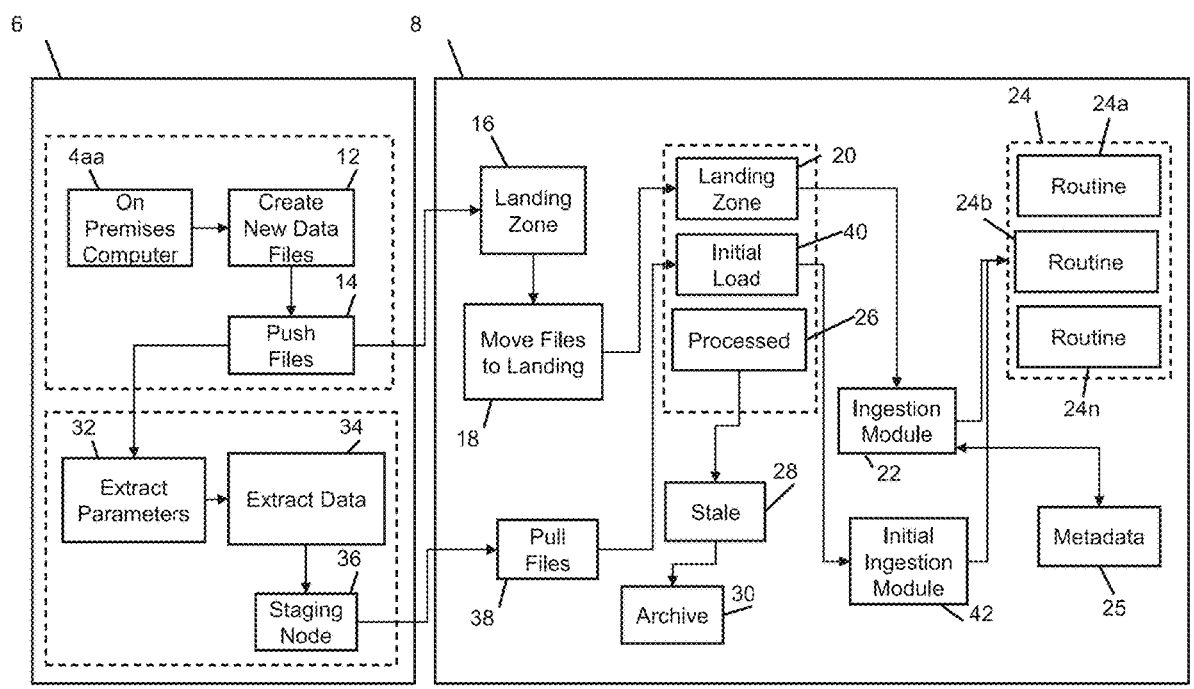
FIG. 2 is a diagram illustrating data moving through a framework for transmitting local data to a remote computing environment.

FIG. 2 is a diagram illustrating data file(s) (hereinafter referred to in the plural, for ease of reference) flowing through a framework for migrating local data files onto a remote computing environment, which framework may address some of the issues in the existing solutions. In the embodiment shown in FIG. 2, the shown enterprise system 6 is considered to be wholly on-premises, solely for illustrative purposes.

At block 12, an internal device 4*aa* creates or has stored thereon, or has access, to a set of data files that are to be migrated onto the computing resources 8. For example, the internal device 4*aa* can be a device operated by an employee to enact a change in a customer bank account within a first application (i.e., generates a data file to open a new bank account). In another example, the internal device 4*aa* can be operated to change certain login credentials for a banking customer with a second application (i.e., generates a data file to update existing authentication records). In yet another example, the internal device 4*aa* can retrieve and generate data files related to stock trades executed for customers with a third application. The preceding examples highlight the potentially heterogeneous nature of the data files, and the heterogeneous nature of the applications used to generate or manage the data files. It is understood that the preceding examples demonstrate simplified singular instances of generating a data file or data set, and that this disclosure contemplates scenarios involving a set of files being generated (e.g., the number of files generated by a small business, or a large multinational business, and everything in between).

At block 14, the data files are pushed into the computing resources 8. In example embodiments, the block 14 denotes a platform for pushing data into the cloud computing resources 8. For example, a functionality in block 14 may be provided by an application (hereinafter the originating application for pushing data) which (1) retrieves data files from the device 4*aa* for uploading to the computing resources 8, and (2) schedules the pushing of the retrieved data files into the computing resources 8 via available transmission resources. In respect of the retrieval, the originating application may include one or more parameters enabling the originating application to cooperate with various data generating applications. For example, the originating application can include an application programming interface (API) to interact with the data required to be retrieved from an ATM, and to interact with data files required to be retrieved from a personal computing device, etc. The application generating the data files can also be configured to store the data files for uploading within a central repository which is periodically checked by the originating application. In at least some example embodiments, the originating application can be configured to encrypt sensitive data, for example with the cryptographic server or module described herein.

The one or more parameters of the originating application can also control the scheduling of when data files are pushed. For example, the originating application can be configured to push data files periodically. In at least some example embodiments, the originating application can be in communication with another application of the computing resources 8 (e.g., landing zone 16) to coordinate pushing data files from the internal device 4 to the computing resources 8 in instances where the computing resources 8 can process the pushed data files in a timely manner.

In at least some example embodiments, the originating application is implemented on the computing resources 8, and instead of being configured to push data is instead configured to pull data files from the enterprise system 6 into the computing resources 8. For example, the originating application can be an application on the computing resources 8 that periodically checks a central repository on the internal device 4 designated for storage of data files to be uploaded to the computing resources 8.

Transmitted on-premises data arrives in a landing zone 16 within the computing resources 8. The landing zone 16 can be preconfigured to immediately move or reassign the arrived data to the control of another application (hereinafter referred to as the cloud administration application) at block 18. In at least some example embodiments, the cloud administration application and the originating application are different functionalities of a single application.

The landing zone 16 can be configured to store data files temporarily, unless one or more criteria are satisfied. For example, the landing zone 16 can be configured to remove all data files more than 15 minutes old unless the device 4 or user account requesting uploading of the data files is authenticated. In example embodiments, the landing zone 16 requires authentication via an access token procedure. The access token and temporary storage configuration can be used to enforce a time sensitive authentication method to minimize potential damage associated with the risk of the access token being exposed.

Upon satisfactory authentication (e.g., where the device 4*aa* is pre-authenticated, or where the landing zone 16 relies upon authentication administered on the device 4), the data files stored thereon can be immediately pushed, via block 18, to the landing zone 20. In example embodiments, various scheduling techniques can be employed to move data between the landing zones. For example, data files stored in the landing zone 16 can be transferred to the landing zone 20 only in response to determining, by the cloud administration application, that certain traffic parameters are satisfied. Continuing the example, data files may only be transferred between the landing zones once the landing zone 20 has capacity, or is estimated to have capacity, to process the received data within a time specified by a traffic parameter.

Data files within the landing zone 20 are subsequently transmitted to the ingestion module 22.

The ingestion module 22 consumes data files for persistent storage in the computing resources 8 (e.g., the persistent storage denoted by the remote computing environment 24, having routines 24A, 24B, and 24C). In at least some example embodiments, the ingestion module 22 can standardize and/or validate data files being consumed, and/or extract metadata related to the request to upload data files for persistent storage. The ingestion module 22 can process the data files being consumed based on a configuration file 23 (FIG. 3) stored within a metadata repository 25.

The metadata repository 25 can include various configuration files 23 having various configuration parameters for processing different data files. Each configuration file 23 can be associated with a particular data file, or a group of related data files (e.g., a configuration file 23 can be related to a stream of data files originating from an application). The parameters can be in the form of a JavaScript Object Notation (JSON) configuration file 23. For example, an example configuration file 23 can include parameters for identifying or determining information within a data file, such as the header/trailer, field delimiter, field names, data type, validation rules, etc. An example configuration file 23 can specify a location within the remote computing environment 24 where the associated data file is to be stored. For example, the configuration file 23 can include or define the table name, schema, etc., used to identify the destination of the data file. An example configuration 23 can include parameters to identify or determine file properties (e.g., different data sets can be stored using different file properties), copy books, parameters to determine if the data uses XSL Transformation (XSLT) or XML Schema Definition (XSD), and so forth.

The configuration file 23 can define rules an ingestor 50 uses to determine a category applicable to the data file being ingested. Particularizing the example, the configuration file 23 can specify one or more configuration parameters to identify a type of data, such as an XML file, by, for example, parsing syntax within the received data file. In at least some embodiments, the configuration parameters can specify a type of data with greater particularly. For example, the configuration parameters, can specify that the data is transactional data related to stock trades which are typically in a particular format.

More generally, the configuration file 23 can facilitate identification and parsing of the ingested data in a variety of ways, such as allowing for the comparison of data formats, metadata or labelling data associated with the data, value ranges, etc. of the ingested data with one or more predefined categories.

A different data flow may be employed for data files being uploaded for the first time, which do not have an associated configuration file 23 stored in the metadata repository 25. For example, the data files may be pushed from block 14 to block 32.

At block 32, the data files from block 12 may be processed to extract one or more parameters related to storing the data on the computing resources 8. Block 32 may require that any data files being uploaded to the computing resources 8 for the first time are accompanied with or include a template file(s) 46 (FIG. 3) for operations (e.g., stored in template repository 47 of FIG. 3). For example, the template file 46 can include an Internet Database Connector (IDC) file which provides the format that the new data file is expected to be stored in the computing resources 8. In example embodiments, the template file 46 can include an IDC file which provides the format that the new data file is stored on the on-premises system. The template file 46 (alternatively referred to as change configuration(s)) can be used to generate the configuration files 23 of metadata repository 25.

Block 32 or block 34 can also include a verification step (not shown). For example, the request, or the template file 46, can be reviewed by a developer to ensure that it is consistent with approaches employed by the computing resources 8. It may be that the developer is required to subsequently transfer the configuration file 23 generated from the template file 46 to the metadata repository 25 to initiate the process of storing data files on the remote computing environment 8.

At block 34, historical data associated with the data files created or designated for ingestion by the computing resources 8 in block 12 can be extracted. This historical data can include metadata such as the author of the data, the relevant section of the enterprise system 6 with which the data should be associated, the application generating the data, the intended destination of the data, and so forth. In at least some example embodiments, the historical data can include previous versions of, or stale data related to the new data file being uploaded to the computing resources 8 (e.g., the historical data can include seven years of past data associated with the new data file). For example, the parameters can include stale data comprising previous transactions in a financial institution enterprise system 6.

At block 36, the data processed at blocks 32 and 34 is moved to a staging or loading zone for uploading to the computing resources 8. In example embodiments, the staging or loading zone denoted by block 36 includes an originating application like originating application discussed in respect of landing zone 16. For example, computing hardware on the enterprise system 6 may be scheduled to transmit data files for uploading to the computing resources 8 overnight, to reduce load on the enterprise system 6. In another example, the staging or loading zone denoted by block 36 can be configured to first transmit time sensitive information for storage to the computing resources 8. For example, transactions may be given special priority for uploading to the computing resources 8.

Landing zone 38, similar to landing zone 16, receives the data files from block 36 within the computing resources 8.

Landing zone 40, similar to landing zone 20, receives the datafiles from landing zone 38, and transmits same to an initial ingestion module 42. In at least some example embodiments, block 40 can denote generating the configuration file 23 for data files to be ingested by processing the extracted parameters or template file 46 of block 32. For example, the template file 46 can be processed to generate the configuration file 23 which enables the conversion of data from the format specified by the template file 46 into the format operating within the computing resources 8. The generating of the configuration file 23 can be conducted by the initial ingestion module 42. The initial ingestion module 42 can be configured to require that a user define configuration parameters not in the template file 46 for subsequent uploading by the ingestion module 22 (e.g., where the template file 46 is insufficient).

Upon generating the configuration file 23, the initial ingestion module 42 can transmit the generated configuration file 23 for storage and use with subsequent data files sharing the same template file 46 or parameters. For example, although not shown to maintain visual clarity, the initial ingestion module 42 can remit any configuration file 23 or parameters to the metadata repository 25 upon receiving them.

Moreover, similar to the landing zone 20, an originating application can be used to control the flow of data from the landing zone 40 to the initial ingestion module 42. The initial ingestion module 42, similar to the ingestion module 22, consumes data for persistent storage in the remote computing resources 8 (e.g., in a segregated or separate remote computing environment 24).

Although not shown, again to maintain visual clarity, data for tracking the flow of data files within the framework (hereinafter tracking data), which tracking data is related to data files that are queued for consumption by the ingestion module 22 or the initial ingestion module 42, can be stored on the computing resources 8. In example embodiments, the tracking data includes at least one of metadata related to the data files (e.g., creating date, origination application, etc.), data related to the requests to upload the data file (e.g., time of request, originating system, etc.), parts of the data file (e.g., entries, hash values of individual data files, etc.), or some combination thereof.

The tracking data can be stored in a variety of ways. In at least one contemplated example embodiment, transmitting the data files to the ingestion module 22 can trigger the tracking data to be sent to the processed database 26. Tracking data within the processed database 26 can be stored only for a predefined amount of time (e.g., 30 days), after which it is sent to the stale database 28, and after a predefined amount of time (e.g., one year), the stale database 28 or controller associated therewith can migrate data into an archive 30. In at least some contemplated example embodiments, the tracking data can be provided to the template repository 47 for storage.

Figure 3:
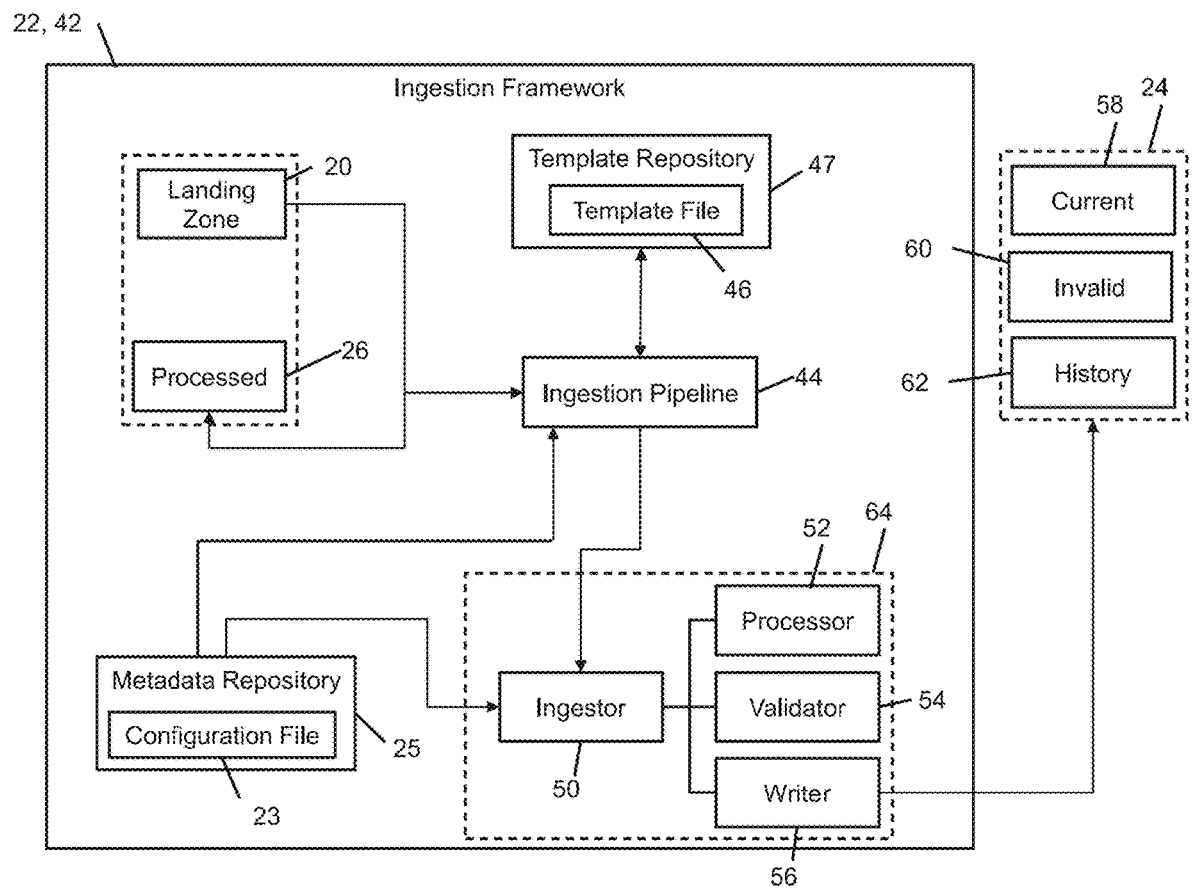
FIG. 3 is a diagram of an example ingestion framework.

FIG. 3 shows a diagram of an example ingestion framework, being either the ingestion module 22 or the initial ingestion module 42 (hereinafter discussed predominantly in respect of ingestion module 22, for simplicity). In FIG. 3, the landing zone 20 and the processed database 26 are shown as within the ingestion module 22, as is the metadata repository 25. It is understood that the shown configuration is illustrative (e.g., a different configuration is shown in FIG. 2 where the landing zone 20, for example, is external to the ingestion module 22), and is not intended to be limiting. For this reason, there is an additional broken lined box surrounding the landing zone 20 and the processed database 26.

The ingestion pipeline 44 receives data files stored within the landing zone 20. In example embodiments, the ingestion pipeline 44 is implemented within a data factory environment of the computing resources 8.

To assign the data files for processing, the ingestion pipeline 44 can communicate with either the template repository 47 or the metadata repository 25. In instances where there is no existing configuration file 23 within the metadata repository ingestion pipeline 44 can retrieve an associated template file 46 from template repository 47. The ingestion pipeline 44 can transmit the template file 46 for processing along with the data files or generate the configuration file 23 for the metadata repository 25. For example, ingestion pipeline 44 can automatically, or with a review of the user (e.g., a developer), convert the template file 46 into the configuration file 23. In instances where metadata repository 25 includes the configuration file 23 associated with the data files being ingested, the ingestion pipeline 44 can transmit the associated configuration file 23 along with the data files being assigned for processing.

The ingestion pipeline 44 assigns data files to the ingestor 50 (e.g., to one of a plurality of instances of the ingestor 50, each instance of the ingestor 50 relying on a separate processor) for writing to remote storage, and/or processing, and/or validation. For example, the ingestor 50 of the computing environment 64 can be responsible for, with a processor 52, processing received data files into a particular standardized format based on the configuration file 23. The ingestor 50 can be responsible for generating the configuration file 23 based on the template file 46 stored in the template repository 47 (e.g., upon receiving the template file 46 from the ingestion pipeline 44, or upon retrieving the template file 46 from template repository 47, etc.). The ingestor 50 can be responsible for validating data files with the configuration file 23 with a validator 54 and writing data files for storage with the writer 56.

Although the ingestor 50 is shown separate from the processor 52, the validator 54, and the writer 56, it is understood that these elements may form part of the ingestor 50. For clarity, the processor 52, validator 54, and writer 56 may be libraries which the ingestor 50 has access to, in order to implement the functionality defined by the respective library. Similarly, the ingestor 50, the processor 52, validator 54, and writer 56 being shown as part of a single remote environment 24 is understood to be illustrative and non-limiting.

Examples of the ingestion pipeline 44 assigning data files to the ingestor 50, and related discussions, are set out below.

Figure 4A:
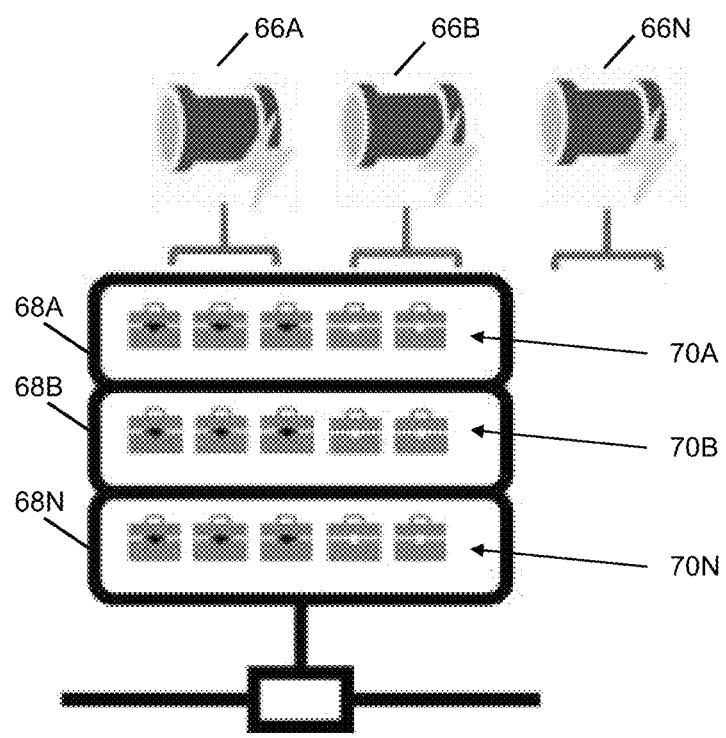
FIGS. 4A and 4B are example schematic diagrams of exiting frameworks for ingesting data into a remote computing environment.
Figure 4B:
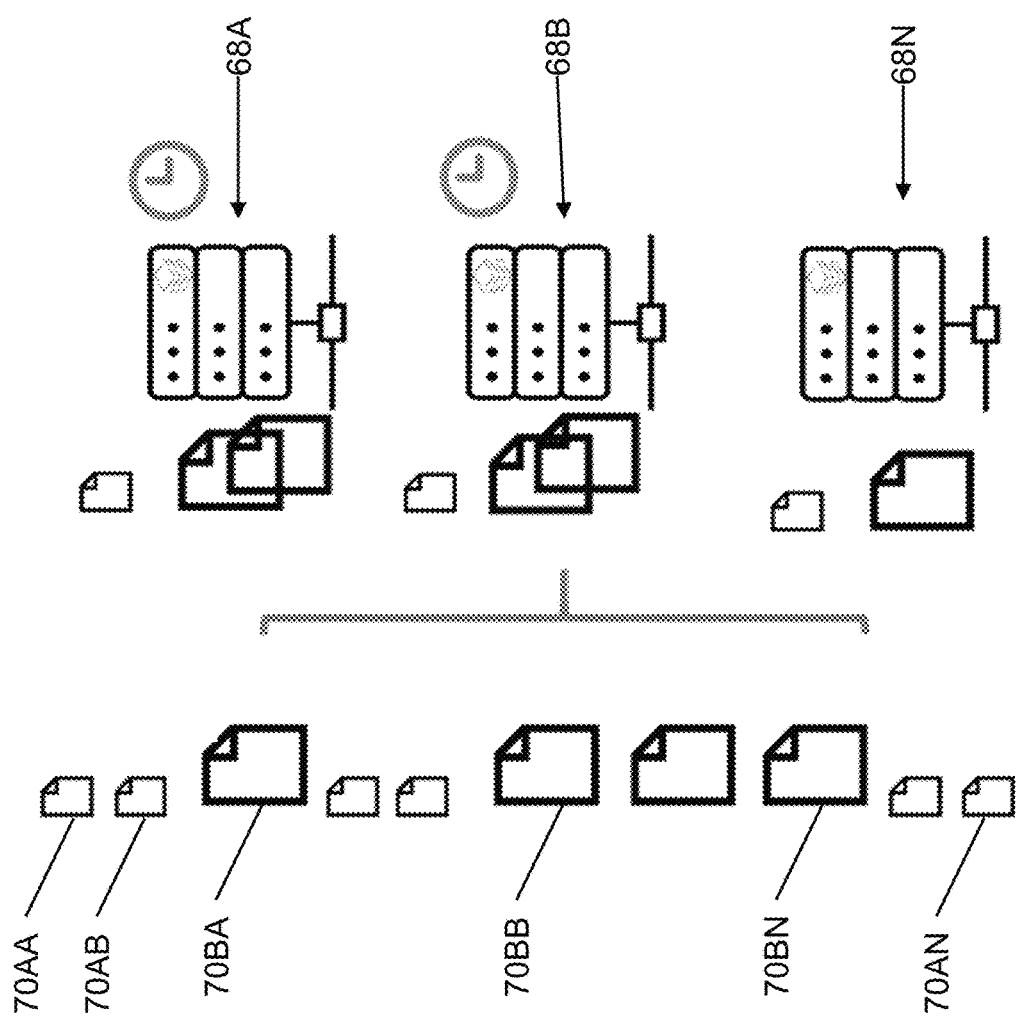

FIGS. 4A and 4B are each examples of schematic diagrams of exiting frameworks for ingesting data into a remote computing environment. Referring first to FIG. 4A, in the illustrated diagram, the plurality of pipelines 66 (denoted by pipelines 66A, 66B . . . 66N) are shown transmitting data files 70 for uploading (denoted generally by data files 70A, 70B . . . 70N) to remote processors 68 (denoted by processors 68A, 68A . . . 68N). It may be understood that in addition to data files for uploading, jobs (e.g., tasks requiring processing) can also be assigned according to the principles set out herein.

As shown in FIG. 4B, in existing approaches, the size of the data file 70 does not impact the assignment of the data file 70 to the remote processor 68. For example, in the illustrated round-robin process for assigning the data file 70 to the remote processor 68, no distinction between large data files (denoted by 70BA, 70BB . . . 70BN) and small data files (denoted by 70AA, 70AB . . . 70AN) is made. Each remote processor 68 handles both large and small data files. Similarly, every available remote processor 68 is assigned a data file 70 for ingestion.

Figure 5A:
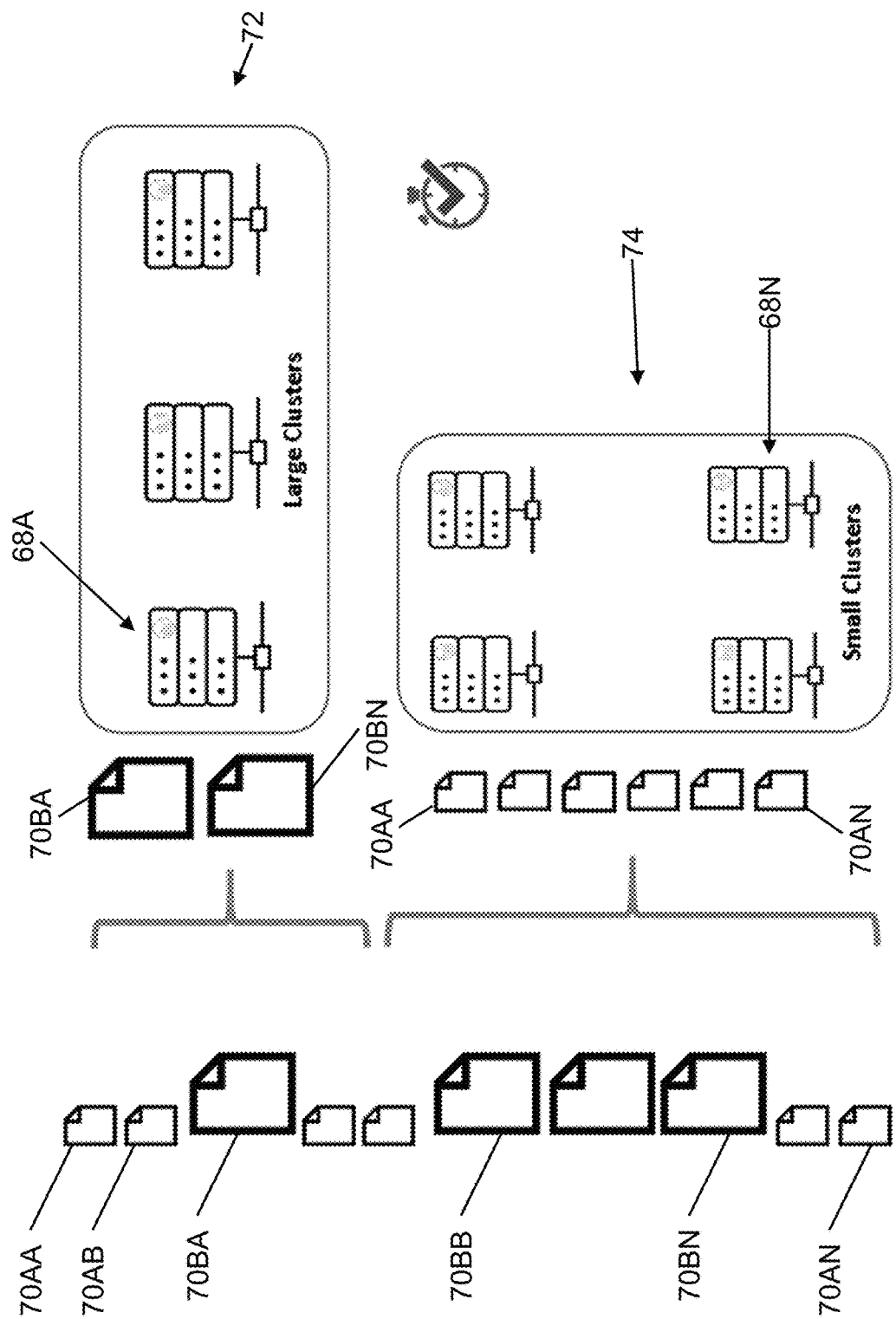
FIGS. 5A and 5B are example schematic diagrams for processing data files for storage in a remote computing environment.

FIG. 5A is an image of an example schematic diagram for ingesting data as disclosed herein.

The remote processors 68 are separated into two or more groups, each group being assigned a separate task based on the heterogeneity of the data file being ingested. Various degrees of heterogeneity are contemplated (e.g., two or more dimensions of heterogeneity). In the example embodiment shown, the data files comprise two distinct heterogeneous groups: large data files (e.g., 70BA), and small data files (e.g., 70 AA), and the processors are divided into related distinct groups: a large file group 72, and a small file group 74.

The ingestion pipeline 44 can assign data files 70 to the remote processors 68 based on a determination of whether the data file 70 being ingested is within a particular heterogenous group. In example embodiments, the ingestion pipeline 44 assigns the data file 70 to a processer 68 of a processor group associated with the determined category (e.g., large file group 72, or small file group 74).

Dividing incoming data files 70 into heterogenous groups, (e.g., large files and small files) may potentially advantageously alleviate bottlenecks. For example, in example observed environments, large files have been determined to take more than 10 minutes to process by a processor 68. This processing time can adversely impact time sensitive smaller files assigned to the same processor 68. Moreover, the processing time for large files can undesirably introduce the potential for a negative feedback loop, wherein the same processor 68 is assigned additional tasks during processing of the large file, slowing the processor 68 down, and leading to further delays in successfully processing the large file.

Figure 5B:
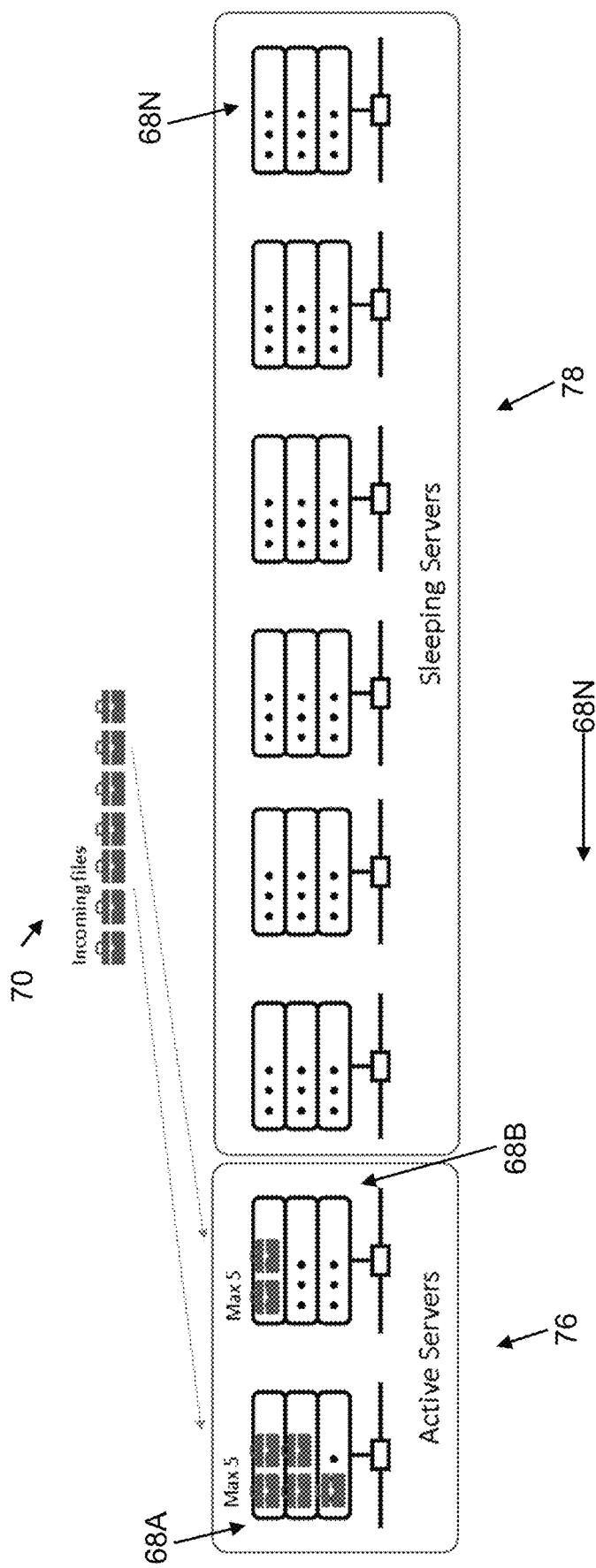

FIG. 5B is an image of another example schematic diagram for ingesting data into the remote computing environment.

In the disclosed framework, each processor 68 can be configured with, or has inherent limitations denoting the number of data files 70 that can be simultaneously processed or queued for processing. For example, the processor 68A may be in communication with a memory that can only queue ten data files. In another example, the processor 68A can be configured to process or queue a maximum of five data files simultaneously, irrespective of memory constraints.

The ingestion pipeline 44 can assign data files 70 to processors 68 based on: (1) whether the particular processor is already active (e.g., processor 68A) (referred to hereinafter as the first factor), and (2) which particular processor has the lowest amount of queued processing (referred to hereinafter as the second factor). For example, in the embodiment shown in FIG. 5B, the next data files 70 for processing can be assigned to processor 68B, as it is already active, and has the lowest amount of queued processing. By assigning data files 70 for processing in this manner, the ingestion pipeline 44 can be configured to reduce the number of active servers, possibly reducing the expense associated with operating active servers.

The determination of which processor 68 is assigned by the ingestion pipeline 44 can happen on a per data file basis, or based on a group of data files. For example, the ingestion pipeline 44 can assign data files 70 to a processor 68 in a group where the data files are related, or individually, which each data file of the related data files 70 being assigned to a different processor 68.

Various implementations of the second factor are contemplated. For example, the lowest amount of queued processing can be determined by reference to the number of data files 70 being processed by the particular processor 68, with reference to the expected completion time of all tasks within the queue of the processor 68, based on a relative amount of queued processing on the processor 68 (i.e., where the lowest amount of queued processing is determined by reference to a processor 68's capacity to process), etc.

In example embodiments, the second factor can be implemented with a variety of dependent factors. For example, in instances where more than one processor satisfies the first and second factors, additional dependent parameters can be considered. One example dependent parameter can require the ingestion pipeline 44 to transmit the data file 70 to the geographically closest processor 68. Another example dependent parameter can require the ingestion pipeline 44 to transmit the data file 70 to a jurisdiction associated with the originating data file 70 (e.g., to comply with regulatory requirements). In example embodiments, the dependent parameter can specify that the ingestion pipeline 44 transmits the data file 70 to the least expensive processor 68.

Different weights and priorities can be assigned to the first and second factors, and in at least some example embodiments the weights and priorities can vary over time. For example, in instances where there are no active processors 68, the first factor may be discarded altogether. In another example, in instances where there are many data files 70 for uploading, the ingestion pipeline 44 can determine that the currently active processor 68 will not satisfy timeliness criteria and activate a new processor 68. In yet another example, in instances where there are few data files 70 for uploading, and no temporal limitations, the ingestion pipeline 44 can allow an active processor 68 to deactivate for want of processing to save costs.

In at least some of the example embodiments, at least some of the limitations or heterogenous groups referred to in FIGS. 5A and 5B are stored in the form of parameters in the metadata repository 25 (e.g., in an associated configuration file 23), or the template repository 47 (e.g., in an associated template file 46).

Although FIGS. 5A and 5B show a framework of ingesting data from an ingestion pipeline 44 into a computing environment 24 within computing resources 8, it is understood that a similar functionality can be applied to importing data from the enterprise system 6 into the computing resources 8.

Figure 6:
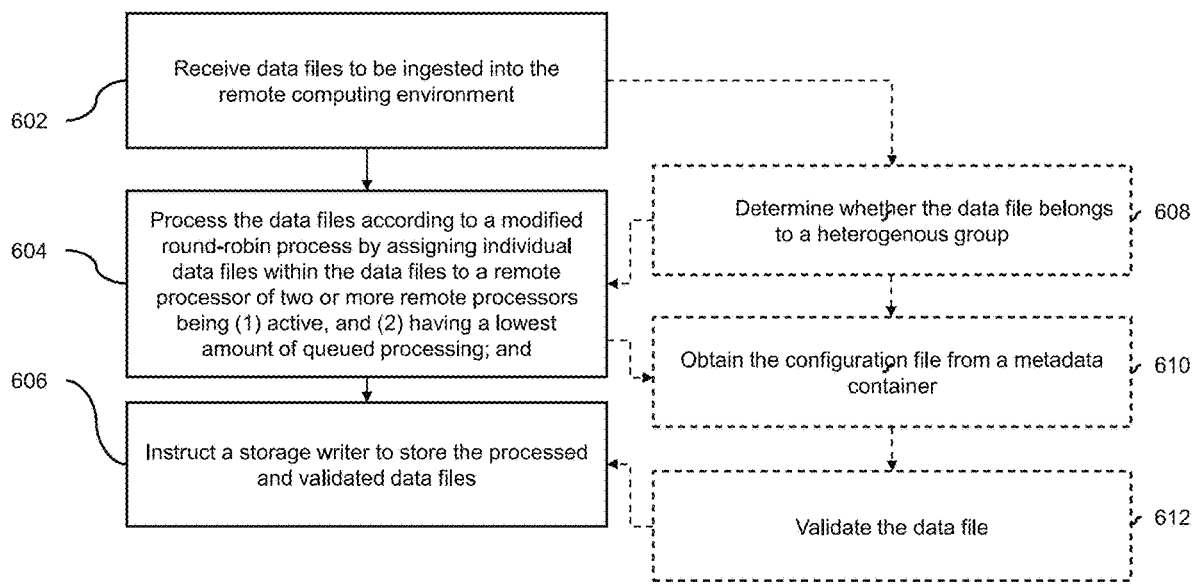
FIG. 6 is a flow diagram of an example embodiment of computer executable instructions for ingesting a plurality of data files into a remote computing environment.

FIG. 6 is a flow diagram of an example method for ingesting a plurality of data into a remote computing environment. For ease of illustration, reference shall be made to elements of the preceding figures to discuss the example flow diagram. It is understood that such reference is not intended to be limiting.

At block 602, data files 70 for ingestion into the remote computing environment 8 are received. In example embodiments, the data files 70 are pulled from the enterprise system 6, or in the alternative, the data files 70 are pushed into a server of the computing resources 8.

In at least some contemplated example embodiments, the method includes transferring the received data files from a first landing zone (e.g., landing zone 16) into a second landing zone (e.g., landing zone 20) associated with an environment in which processed data files are stored. The use of multiple landing zones can potentially provide for a robustness within the disclosed framework. For example, less storage infrastructure may be assigned to the first landing zone, where relatively less storage is expected to be required owing to data files being stored on a temporary basis, as compared to the second landing zone. In instances where the second landing zone is closer to the location of processing (e.g., the ingestion module 22), an application can schedule the transmission of data from the first landing zone to the second landing zone to ensure that the second landing zone is not overwhelmed, introducing undesirable latency. In another example, one or more preliminary processes may be implemented on the data files 70 in the first landing zone prior to the data files 70 entering the second landing zone. For example, the first landing zone 20 can be configured to determine whether the transmitted data file 70 includes a satisfactory template file 46 within the template repository 47.

In example embodiments, greater security infrastructure is assigned to the first landing zone. For example, the landing zone 16 can require authentication and be associated with or have access to infrastructure to implement, for example, an access token scheme.

At block 604, the received data files 70 are processed according to a modified round-robin process. The modified round-robin process assigns individual data files of the data files 70 to a particular processor of two or more processors 68. The modified round-robin process includes determining which of the two or more processors 68 is (1) active, and (2) has the relatively low amount of queued processing. Relatively low can include lower than all the other processors of the two or more processors 68. Relatively low can mean lower than a certain amount of the two or more processors 68 (e.g., in the lowest 20% of processors 68, etc.). The two determinations can be made simultaneously, or either determination could be made first.

Optionally, at block 608, a determination may be made as to whether the data file being assigned belongs to one of two or more heterogeneous groups to inform block 604. For example, the data file can be determined to be a large data file, or a small data file. The delineation between the files can be binary (i.e., either small or large), or involve multiple categories (i.e., small, very small, large, and very large), and so forth. In example embodiments, the ingestion pipeline 44 determines whether the data file belongs to a heterogeneous group based on the template file 46 stored in template repository 47.

At block 604, in instances where the ingestion pipeline 44 is aware of whether the data file is a member of a heterogeneous group, the ingestion pipeline 44 can determine one or more parameters of the processors 68 to which data files are being assigned. For example, each processor 68 can have a parameter designating whether the processor 68 handles only certain heterogeneous group tasks, a mixture of certain heterogeneous group tasks, or some other configuration. Particularizing the example, a processor 68 designated to process large files (e.g., a processer within large file group 72) can be configured with a maximum large file parameter. The maximum large file parameter can designate the largest file size to be processed by the processor 68, or the number of large files that can be processed or queued for processing on the processor 68. Similarly, the processor 68 can be designated to process small data files (e.g., a processer within small file group 74), and configured with a maximum small file parameter.

Processing the data file can include, as shown in block 610, the ingestion module 22, 42 obtaining a configuration file 23 from the metadata repository 25. In example embodiments, processing can include adjusting the data to a standardized format (e.g., the functionality of the processor 52), or validation of the data files being ingested (e.g., the functionality of the validator 54), etc.

The ingestion module 22, 42 can obtain the configuration file 23 itself, or can be provided with the configuration file 23 by the ingestion pipeline 44.

By separating the configuration file 23 in the metadata repository 25 from the data file being ingested, the ingestion module 22, 42 can be responsive to changing circumstances. For example, the ingestion module 22, 42 can accommodate changes in data file categories where there are appropriate amendments to the metadata repository 25. This compartmentalization also allows for relatively easy updates to the configuration file 23, as the ingestion pipeline 44 or ingestion module 22, 42 does not have to be shut down to update validation parameters.

Optionally, as shown in block 612, the ingestion module 22, 42 (i.e., validator 54) validates the data file based on the configuration file 23. Hereinafter, the terms processing and validating may interchangeably be referred to as processing.

In example embodiments, the ingestion module 22, 42, upon receipt of the configuration file 23 and the associated data file, processes the data file according to processing patterns (1) for maintaining control information and (2) for processing different file types defined by the configuration file 23.

The processing patterns for maintaining control information can include parameters for extracting control dimensions. For example, each data file being ingested can be required to include an as-of-date property and a record count property. The ingestor 50 or processor 52 can be configured to search for and retrieve the aforementioned properties from the data file being ingested (e.g., via a bespoke extraction method). The processing patterns for maintaining control information can include parameters for validating that the data file being ingested satisfies be extracted control dimensions. For example, the ingestor 50 or validator 54 can confirm the as-of-date property matches corresponding metadata within the request, or the metadata of the data file. The ingestor 50 or validator 54 can inspect the data file to determine whether it includes the number of records indicated by the record count property.

The processing patterns for processing different file types can include parameters for adjusting data into formats excepted for storage. For example, the ingestor 50 or processor 52 can be configured to enforce parameters that specify characteristics of the entries that are able to be ingested into the formats accepted for storage (e.g., header entries may not be accepted), or implement other parameters for adjusting or otherwise manipulating unsatisfactory entries (e.g., a Cobol record filter for filtering certain string expressions). The processing patterns for processing different file types can include parameters for validating that the data files satisfy entry validation parameters. For example, the ingestor 50 or validator 54 can be configured to check that the data file satisfies parameters specifying record and field level validation requirements. In example embodiments, for example, the parameters can specify whether content within a particular field is optional, always processed, or never processed. In example embodiments, for example, the parameters specify whether any specific treatment is required for a field (e.g., controls for whether whitespace should be trimmed from the left or right of the field).

As a result, all processed data files 70 can be separated into valid data files and invalid data files. Valid data files can be processed according to block 606, and in example embodiments the invalid data files can also be stored for reference.

At block 606, a storage writer is instructed to store the processed and/or validated data files. For example, the writer 56 can be instructed to store the data file of the data files 70 in the remote computing environment 24.

It is understood that sequences other than the sequences implied in FIG. 6 are contemplated. For example, block 608 may occur simultaneously with block 604. In at least some contemplated embodiments, the data files 70 are validated (block 610 and 612) prior to determining whether the datafile is a large datafile (block 608), and so forth.

Referring again to FIG. 3, generally, the ingestor 50 processes received data files in accordance with related the configuration file 23 from the metadata repository 25.

The writer 56 can be configured to write or transmit data files to the remote computing environment 24. In FIG. 3 this is shown as including a current representation of a data set 58, an invalid representation of a dataset 62 (e.g., a representation including all invalid entries which were attempted to be added to the data set), and a previous representation of a data set 60 (in the alternative, and for ease of reference, collectively referred to as the "data representations", or individually as simply representations). The writer 56 can be configured to write or transmit data files within the computing resources 8, and not just computing environment 24.

Figure 7:
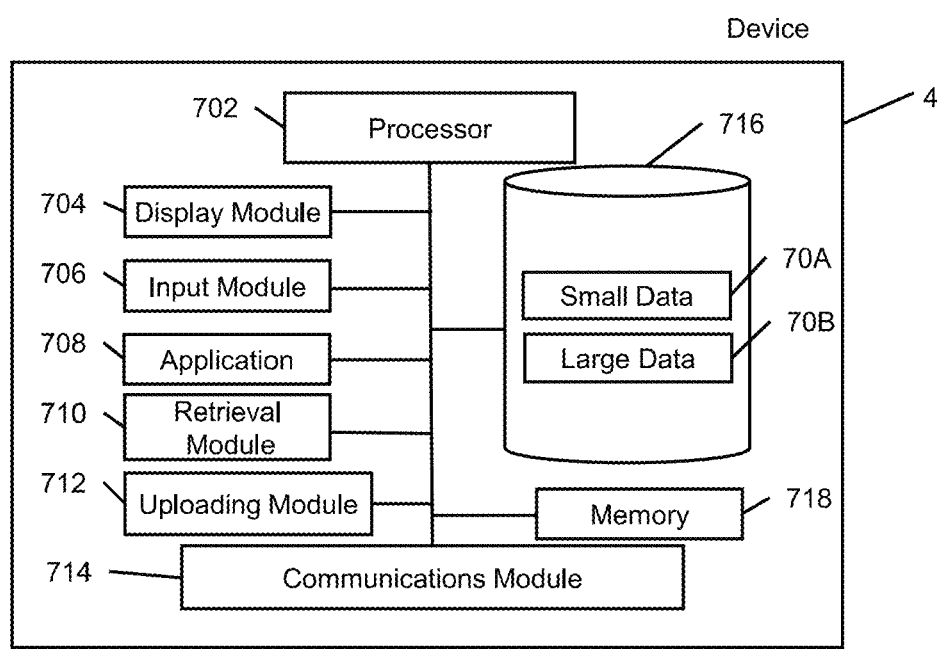
FIG. 7 is a block diagram of an example configuration of a device.

Referring now to FIG. 7, an example configuration of a device 4 is shown. It can be appreciated that the device 4 shown in FIG. 7 can correspond to an actual device or represent a simulation of such a device 4. The shown device 4 can be an internal device, used to implement the functionality of the enterprise system 6 described herein, or an external device, used to implement the functionality of the computing resources 8 as described herein, or a device 4 to access either of the enterprise or the remote computing systems. The device 4 can include one or more processors 702, a communications module 714, and a data store 716 storing data for uploading (e.g., small data files 70A and large date files 70B).

Communications module 714 enables the device 4 to communicate with one or more other components of the computing environment 2 via a bus or other communication network, such as the communication network 10. The device 4 includes at least one memory 718 or memory device that can include a tangible and non-transitory computer-readable medium having stored therein computer programs, sets of instructions, code, or data to be executed by processor 702. FIG. 7 separately illustrates examples of modules and applications stored in memory 718 on the device 4 and operated by the processor 702. It can be appreciated that any of the modules and applications shown in FIG. 7 may also be hosted externally and be available to the device 4, e.g., via the communications module 714.

In the example embodiment shown in FIG. 7, the device 4 includes a display module 704 for rendering GUIs and other visual outputs on a display device such as a display screen, and an input module 706 for processing user or other inputs received at the device 4, e.g., via a touchscreen, input button, transceiver, microphone, keyboard, etc. The shown device 4 also includes one or more applications (shown as the singular application 708) that generates data for uploading to a remote computing environment, or for scheduling data to be processed by the processors of the computing resources 8. The device 4 may include a retrieval module 710 to extract historical data from the device 4 or the enterprise system 6 for uploading to the remote computing environment. For example, the retrieval module 710 can be used to identify data related to the data being uploaded, e.g., related historical data. The uploading module 712 enables the device 4 to interface with the remote computing environment 8, or a subset thereof, to transfer data to the remote computing environment 8. The data store 716 may be used to store data, such as, but not limited to, an IP address or a MAC address that uniquely identifies device 4. The data store 716 may also be used to store data ancillary to transmitting data to the computing environment 8, such as, but not limited to, login credentials, user preferences, cryptographic data (e.g., cryptographic keys), etc.

Figure 8:
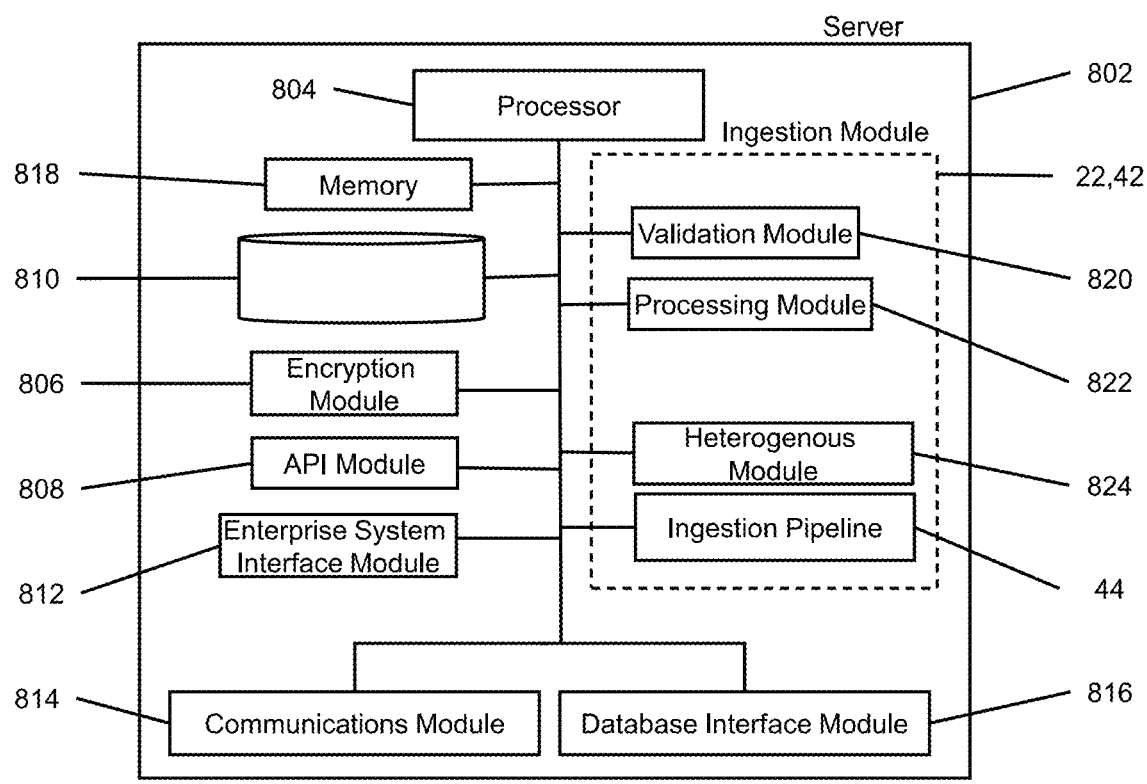
FIG. 8 is a block diagram of an example server of a remote computing environment.

Referring to FIG. 8, an example configuration of a server 802 implementing the functionality of the remote computing environment 8 is shown. It can be appreciated that the server 802 shown in FIG. 8 can correspond to an actual device, or represent a simulation of such a server 802, or represent a configuration of multiple servers cooperating to provide the requisite functionality. The server 802 can include one or more processors 804, a communications module 814, and a data store 810 (e.g., for storing the template file 46 of template repository 47, and/or the configuration file 23 of the metadata repository 25, and the data files 70, etc.), and a database interface module 816.

Communications module 814 enables the server 802 to communicate with one or more other components of the remote computing environment 8 or the enterprise system 6 via a bus or other communication network, such as the communication network 10. The server 802 includes at least one memory 818 or memory device that can include a tangible and non-transitory computer-readable medium having stored therein computer programs, sets of instructions, code, or data to be executed by processor 804. FIG. 8 separately illustrates examples of modules and applications stored in memory 818 on the server 802 and implemented or persisted by the processor 804. It can be appreciated that any of the modules and applications shown in FIG. 8 may also be hosted externally and be available to the server 802, e.g., via the communications module 814.

In the example embodiment shown in FIG. 8, an application programming interface (API) module 808, for facilitating communication between the server device 802 and other remote computing environments (e.g., example embodiments where the remote computing environment 24 is hosted externally to server 802), or for facilitating communication between the server 802 and a device 4 (whether an internal or external device 4), or for facilitating communication between the server 802 and a specific application, and so forth. The server 802 may also include an enterprise system interface module 812 whose sole purpose is to facilitate communication with the enterprise system 6.

The server 802 includes the ingestion module 22, 24, which illustratively includes the functionality to validate data files, via the validation module 820, and to process data files, via the processing module 822. The ingestion module 22, 42 can also search, change, store, or otherwise manipulate data files for transmission or for the purpose of storing the data.

The ingestion pipeline 44 assigns data files for processing as described herein. The ingestion pipeline 44 can cooperate with the heterogenous module 824, which can store definitions of heterogeneous groups, or parameters for determining whether data files fall within the heterogeneous groups, to determine whether a particular data file belongs to a heterogeneous group, and to process the file accordingly.

The encryption module 806 can encrypt data in a variety of manners prior to the data representations being stored. For example, the encryption module can encrypt data once it has been validated. In at least some example embodiments, the data being ingested is already encrypted, and the encryption module 806, in cooperation with a complementary encryption module on the device 4 or on-premises (not shown), decrypts the data for ingestion so that any data transmitted between the premises and the remote computing environment 8 is encrypted.

The database interface module 816 facilitates communication with databases used to store the ingested data. For example, the database interface module 816 can be used to communicate with a database for "cold" storage to store the older data, which in the example embodiment is not stored on server 802. The data store 810 may be used to store data, such as, but not limited to, an IP address or a MAC address that uniquely identifies server 802. The data store 810 may also be used to store data ancillary to transmitting or receiving data within the computing environment 8, such as, but not limited to, login credentials, user preferences, cryptographic data (e.g., cryptographic keys), etc.

Figure 9:
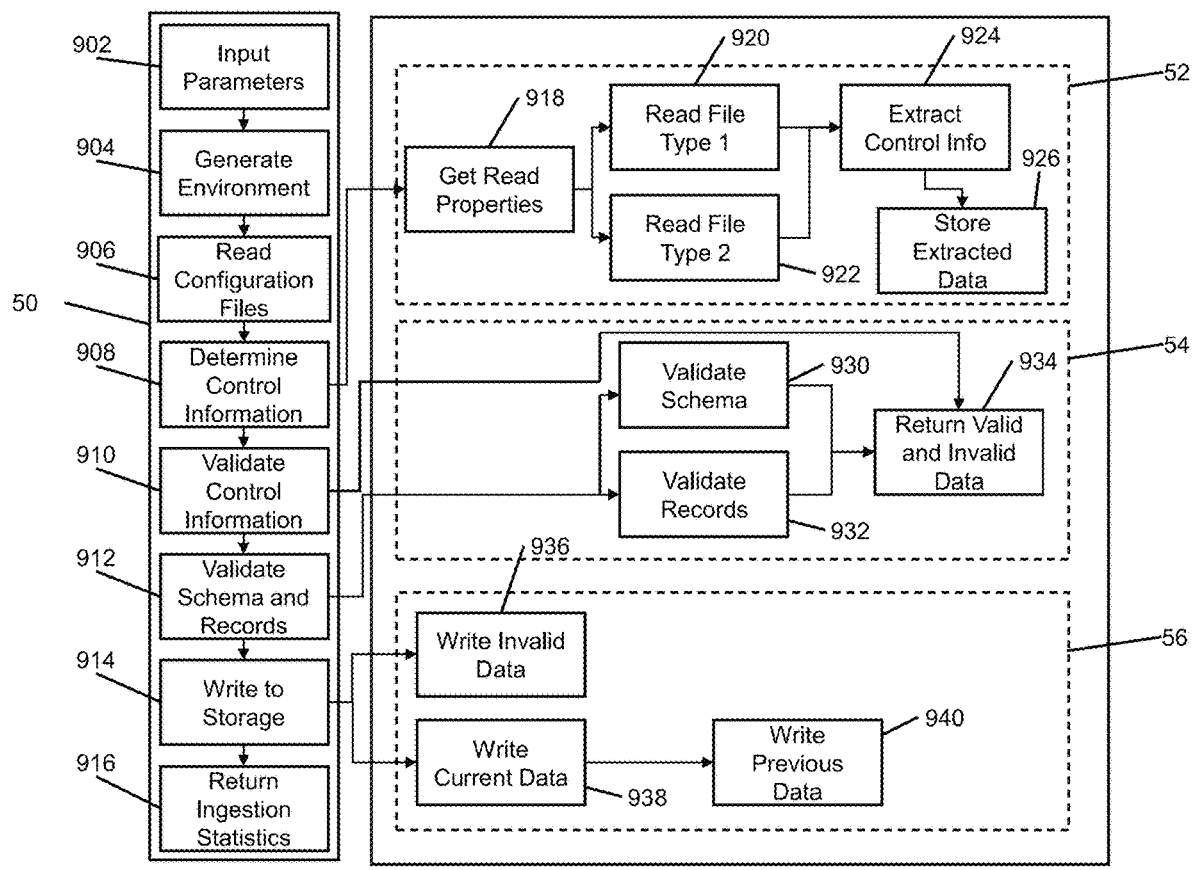
FIG. 9 is a flow diagram of an example method for ingesting a plurality of data files into a remote computing environment.

Referring now to FIG. 9, a flow diagram of an example method for ingesting a plurality of data files into a remote computing environment is illustrated. For ease of illustration, reference shall be made to elements of the preceding figures to discuss the example flow diagram. It is understood that such reference is not intended to be limiting.

At block 902, the ingestor 50 receives the data file 70 and any associated parameters (e.g., information designating a particular processor 68).

At block 904, the ingestor 50 generates the computing environment where the data file 70 will be processed. Generating the computing environment can include scheduling the use of the determined processor 68, storage capacity, etc.

At block 906, the ingestor 50 reads or loads one or more configuration files 23 from the metadata repository 25. In example embodiments, the one or more configuration file 23 can represent a subset of all configuration files 23 stored on the metadata repository 25. For example, the subset can be a filtered subset based on parameters within the template file 46 associated with the data file 70. Particularizing the example, the template file 46 can specify the source of the data file 70, narrowing the plurality of configuration files 23 (e.g., a single configuration file 23) to the subset of configuration files 23 transmitted to the ingestor 50 based on association with the specific source and data file 70. The configuration file(s) 23 can be loaded in closer proximity to the processor 68 instantiating the ingestor 50 to reduce latency.

At block 908, the ingestor 50 determines the control information (e.g., as discussed in respect of FIG. 6) used to ingest the data file 70.

As shown in block 918, determining the control information to ingest the data file 70 can include retrieving any properties or tools required to read the data file 70. In example embodiments, the properties are specified in the configuration file 23. In at least some example embodiments, the properties or tools are identified by the configuration file 23, and can be retrieved by the ingestor 50. The properties or tools can include, for example, Cobrix Libraries needed to process the data file 70, or data identifying the delimiter using the delimiter file, etc.

Blocks 920 and 922 demonstrate an aspect of the modularity of the proposed framework. Each of block 920 and 922 define a path travelled by different file types. Block 920 can represent an XML file type, whereas block 922 can represent another file type.

At block 924, the processor 52 extracts control information from the data file 70.

At block 926, the processor 52 stores extracted control information for use to validate the data file 70. For example, the control information can be stored, possibly temporarily to avoid storage fees, in metadata repository 25 or template repository 47.

At block 910, the extracted control information is used to validate the data file 70.

At block 912, the schema of the data file 70 and/or entries in the data file 70 are validated. For example, the validator 54 can determine whether entries are invalid (block 932). In another example, the validator 54 can determine whether the data file 70 satisfies a schema (e.g., enforced by the remote computing environment 24) for storing data files remotely (block 930). For example, the schema can specify that the data file includes certain columns (e.g., entries requiring the completion of certain regulatory requirements), that entries in the data file 70 adhere to certain formats (e.g., date files are stored as mm/dd/yyyy) etc.

At block 934, the data file 70 is parsed into validated and invalid data for subsequent writing into the computing environment 24. The data file 70 can be wholly invalid, or include entries which are invalid.

At block 914, the data file 70 (assuming that it is validated) is written into the computing environment 24. As shown in blocks 938 and 936, the valid and invalid data can be written to separate destinations (e.g., as defined by the configuration file 23), a current representation of the data set and an invalid representation of the data set, respectively.

The ingestor 50 can determine, during the course of writing data pursuant to block 936 or otherwise, that the data file 70 will displace or replace information in the current representation. For example, the data file 70 can update the ownership of a particular security. The ingestor 50 can be configured to write any displaced or replaced information into a previous representation of the data set in block 940

At block 916, the ingestor 50 transmits ingestion statistics (e.g., time to process the data file, number of entries found invalid, etc.), including tracking data, for storage. For example, the ingestion statistics and tracking data can be sent to the template repository 47 for storage.

Figure 10A:
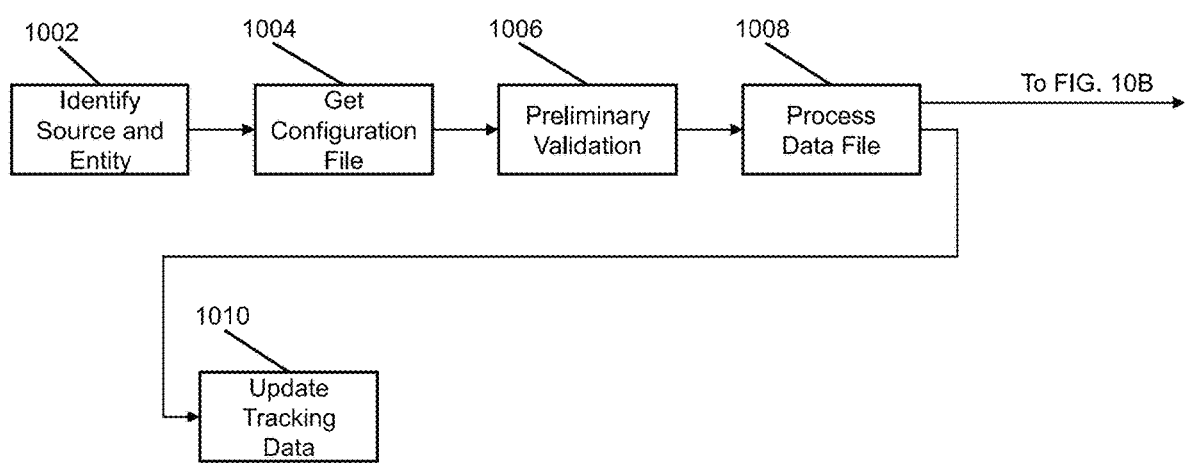
FIGS. 10A and 10B illustrate a flow diagram of another example method for ingesting a plurality of data files into a remote computing environment.
Figure 10B:
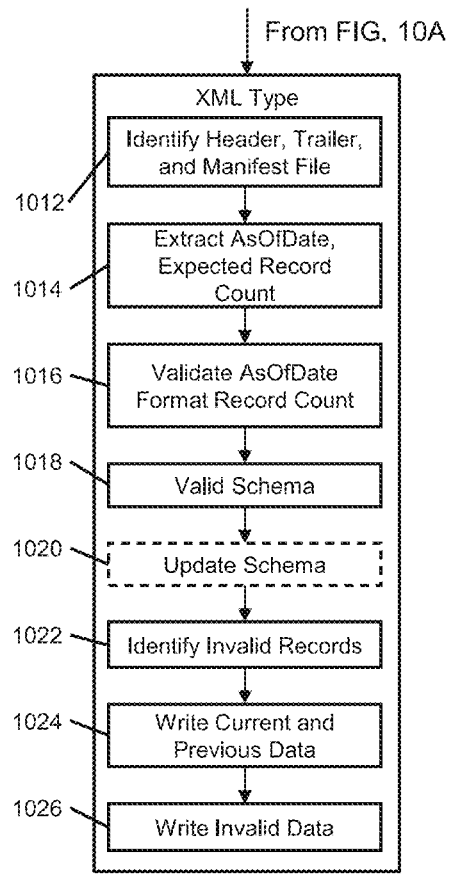

FIGS. 10A and 10B illustrate a flow diagram of another example method for ingesting a plurality of data files into a remote computing environment. For ease of illustration, reference shall be made to elements of the preceding figures to discuss the example flow diagram. It is understood that such reference is not intended to be limiting.

At block 1002, the source of the data file 70 (e.g., a particular computing resource of the enterprise system 6, such as server X) and the entity associated with the data file 70 (e.g., a subsidiary, or finance division of the enterprise system 6, etc.) are identified. In example embodiments, the source and entity are identified in the template file 46 by the ingestion pipeline 44, or the ingestor 50, or a combination thereof.

At block 1004, the configuration file 23 associated with the source and the entity is retrieved or transmitted to the ingestor 50. For example, the metadata repository 25 can allow for filtering the plurality of configuration files 23 by source and entity. This approach can advantageously require siloed data in on prem systems in order to integrate with the configuration file 23 based ingestion framework, which may reduce the risk associated with data being lost or inadvertently accessed.

At block 1006, the ingestor 50 performs a preliminary validation. The preliminary validation can include determining whether the configuration file 23 is the most up to date configuration file 23 associated with the data file 70.

At block 1008, the ingestor 50 processes the data file 70 with the determined configuration file 23.

FIG. 10B illustrates example processing for an XML data file type. The example is understood to not be limiting, and other configuration files 23 for use to process other XML files in a different manner, or any other data file 70 type, are contemplated.

At block 1012, the configuration file 23 is used to identify a header and trailer in the data file 70, and a manifest file. The identification of these features of the data file can allow the ingestor 50 to identify entries, for example by reference to the identified elements (e.g., information following the header is an entry, etc.).

At block 1014, the data file 70 is parsed to identify control information including an AsOf Date property, identifying when the data file 70 was created, and an Expected Record Count property, identifying the number of entries in the data file 70 to be uploaded.

At block 1016, the properties identified in block 1014 are validated.

At block 1018, the ingestor 50 can validate that the schema which the data file 70 is required to comply with, is up to date. In example embodiments, the injector 50 determines whether the data file 70 complies with the schema.

Optionally, at block 1020, if the schema allows for updating, and the data file proposes to update the data schema, the schema is updated.

By allowing the data file 70 to update the schema used to store the data set in the computing environment 24, the ingestion module 22, 42 can be responsive to changing circumstances. For example, the ingestion module 22, 42 can quickly adopt new schemas by processing a data file 70 to change the schema, instead of using a separate process to update schemas. This compartmentalization also avoids delays to configure the ingestion module 22, 42 to seek out new schemas.

At block 1022, the ingestor 50 identifies any invalid records within the data file 70. The configuration file 23 can provide parameters to determine which records are invalid.

At block 1024, the ingestor 50 can write valid data within the data file 70 to a current representation of a data set associated with the data file 70. Data which is displaced by the new data within the data file 70 can be written into a previous representation of the data file 70.

Referring again to FIG. 10A, at block 1010, the ingestor 50 can update the tracking data to incorporate writing of the data file 70.

It will be appreciated that only certain modules, applications, tools, and engines are shown in FIGS. 2, 3, 7 and 8 for ease of illustration and various other components would be provided and utilized by the device 4, enterprise system 6, and/or the remote computing environment 8, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the computing environment 2, or accessible or connectable thereto. Any application or module herein described may be implemented using computer readable/executable instructions that may be stored or otherwise held by such computer readable media.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A device for ingesting data files into remote computing environments for storage, the device comprising:
a processor;
a communication module coupled to the processor; and
a memory coupled to the processor, the memory storing computer executable instructions that when executed by the processor cause the processor to:
receive a plurality of data files;
process the plurality of data files according to a modified round-robin process, the modified round-robin process assigning data files for processing by:
determining which of a plurality of remote processors are active;
determining an amount of queued processing for the active remote processors; and
assigning each data file of the plurality of data files to a remote processor of the plurality of remote processors based on the remote processor (1) being active, (2) having a lower amount of queued processing relative to other processors of the active remote processors, and (3) being a less expensive processor relative to other processors of the active remote processors, wherein processing new data files is delayed in response to (1) no currently active remote processors having capacity to process the new data files, and (2) a number of the new data files being below a minimum threshold for activating inactive remote processors; and
instruct a storage writer to store processed data files.

2. The device of claim 1, wherein processing the plurality of data files comprises validating the plurality of data files, and the instructions further cause the processor to:
validate each data file based on an associated configuration file received from a metadata container.

3. The device of claim 2, wherein the configuration file defines processing patterns for maintaining control information and for processing different file types.

4. The device of claim 3, wherein:
the processing patterns for maintaining control information comprise parameters for:
(1) extracting control dimensions; and
(2) validating that the individual data file satisfies the extracted control dimensions,
and the processing patterns for processing different file types comprise parameters for:
(1) adjusting the individual data file into a format accepted for storage, and
(2) validating that the individual data file satisfies entry validation parameters.

5. The device of claim 1, wherein the plurality of data files are received from one or more on-premises systems, and wherein the instructions further cause the processor to:
transfer the received data files from a first secured landing zone into a second landing zone associated with an environment in which processed and validated data files are stored.

6. The device of claim 1, wherein the instructions further cause the processor to:
determine, for each data file in the plurality of data files, if the individual data file is associated with one of two or more heterogenous groups,
and wherein the round robin process assigns files based on which heterogenous group the individual data file is associated with.

7. The device of claim 6, wherein the two or more heterogenous groups comprise mutually exclusive groups of a large data file group and a small data file group, wherein the large data file group is larger than the small data file group.

8. The device of claim 7, wherein large data files are assigned based on a maximum large file parameter of the plurality of remote processors.

9. The device of claim 7, wherein at least one of the plurality of remote processors solely processes large data files.

10. The device of claim 7, wherein small data files are assigned to remote processors without regard for a maximum large file parameter of the plurality of remote processors.

11. The device of claim 10, wherein at least one of the plurality of remote processors solely processes small data files.

12. A method for ingesting data files into remote computing environments, the method comprising:
receiving a plurality of data files;
processing the plurality of data files according to a modified round-robin process, the modified round-robin process assigning data files for processing by:
determining which of a plurality of remote processors are active;
determining an amount of queued processing for the active remote processors; and
assigning each data file of the plurality of data files to a remote processor of the plurality of remote processors based on the remote processor (1) being active, (2) having a lower amount of queued processing relative to other processors of the active remote processors, and (3) being a less expensive processor relative to other processors of the active remote processors, wherein processing new data files is delayed in response to (1) no currently active remote processors having capacity to process the new data files, and (2) a number of the new data files being below a minimum threshold for activating inactive remote processors; and instructing a storage writer to store processed data files.

13. The method of claim 12, wherein processing the plurality of data files comprises validating the plurality of data files, and the method includes:

validating each data file based on an associated configuration file received from a metadata container.

14. The method of claim 13, wherein the configuration file defines processing patterns for maintaining control information and for processing different file types.

15. The method of claim 14, wherein:

the processing patterns for maintaining control information comprise parameters for:
(1) extracting control dimensions; and
(2) validating that the individual data file satisfies the extracted control dimensions, and the processing patterns for processing different file types comprise parameters for:
(1) adjusting the individual data file into a format accepted for storage, and
(2) validating that the individual data file satisfies entry validation parameters.

16. The method of claim 12, wherein the plurality of data files are received from one or more on-premises systems, and wherein the method includes:

transferring the received data files from a first secured landing zone into a second landing zone associated with an environment in which processed and validated data files are stored.

17. The method of claim 12, further comprising:

determining, for each data file in the plurality of data files, if the individual data file is associated with one of two or more heterogenous groups, and wherein the round robin process assigns files based on which heterogenous group the individual data file is associated with.

18. The method of claim 17, wherein the two or more heterogenous groups comprise mutually exclusive groups of a large data file group and a small data file group, wherein the large data file group is larger than the small data file group.

19. A non-transitory computer readable medium for ingesting data files into remote computing environments, the computer readable medium comprising computer executable instructions for:

receiving a plurality of data files;

processing the plurality of data files according to a modified round-robin process, the modified round-robin process assigning data files for processing by:

determining which of a plurality of remote processors are active;

determining an amount of queued processing for the active remote processors; and assigning each data file of the plurality of data files to a remote processor of the plurality of remote processors based on the remote processor (1) being active, (2) having a lower amount of queued processing relative to other processors of the active remote processors, and (3) being a less expensive processor relative to other processors of the active remote processors, wherein processing new data files is delayed in response to (1) no currently active remote processors having capacity to process the new data files, and (2) a number of the new data files being below a minimum threshold for activating inactive remote processors; and instructing a storage writer to store processed data files.

* * * * *